Dec. 7, 1943. O. WITTEL 2,336,330
RANGE FINDER
Filed July 19, 1941
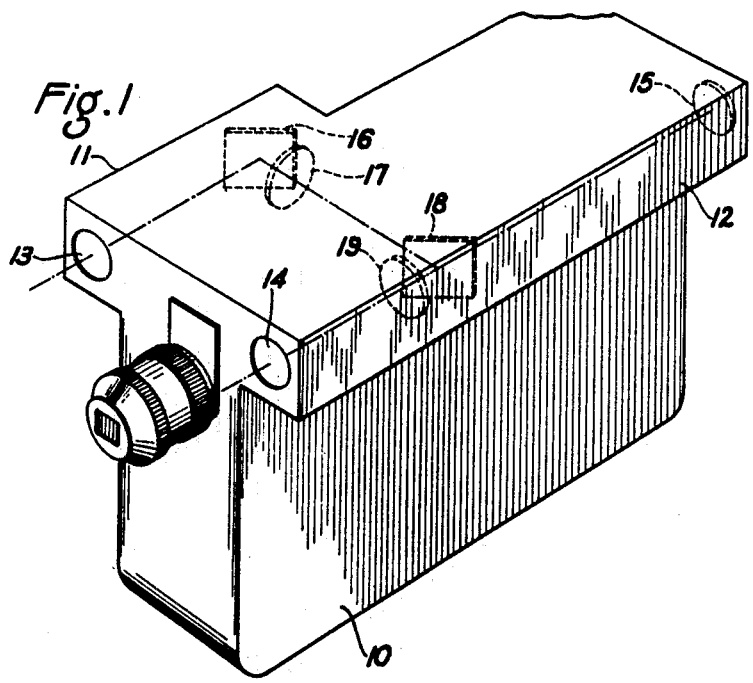
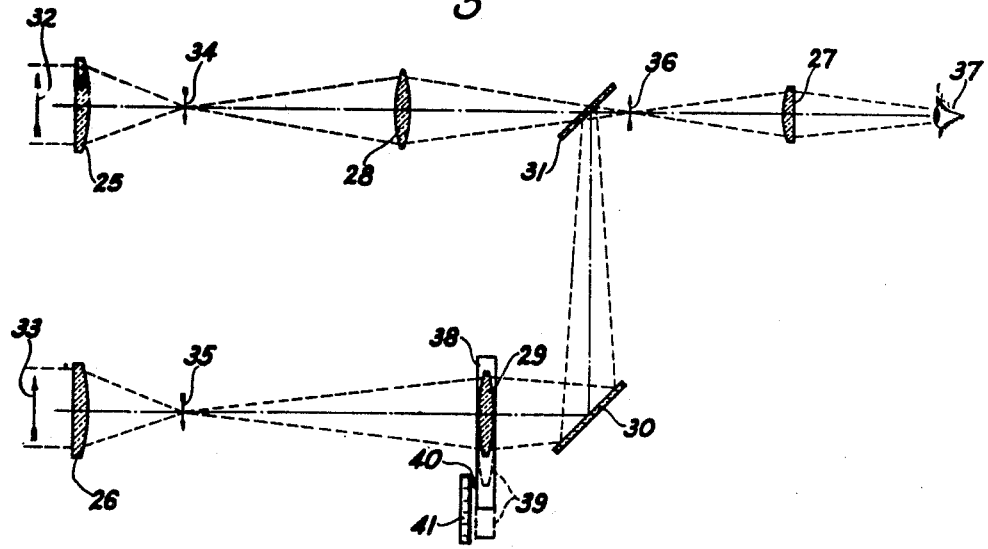
Otto Wittel
INVENTOR
BY
ATTORNEY Patented Dec. 7, 1943

2,336,330

UNITED STATES PATENT OFFICE 2,336,330

RANGE FINDER

Otto Wittel, Rochester, N. Y., assignor to Eastman Kodak Company, Rochester, N. Y., a corporation of New Jersey Application July 19, 1941, Serial No. 403,203

6 Claims. (Cl. 88—2.4)

This invention relates to range finders particularly to coincidence type range finders.

It is the object of the invention to provide a range finder which can conveniently be mounted on a camera, preferably coupled to the focusing mechanism thereof, without interfering with the other parts and features of the camera. Specifically, it is an object of the invention to provide a range finder having all of the advantages of those range finders which employ lenses, (as distinguished from those whose optical elements consist entirely of reflecting surfaces) and at the same time does not require equal optical paths for the two halves of the system. Thus with the present invention, it is not necessary to have the eyepiece or viewing part of the system symmetrical with respect to the objective lenses of the system.

According to the invention, the range finder is provided with two laterally spaced objective lenses preferably of the same power and two optical relay systems such as erecting lenses respectively cooperating with the objective lenses to constitute terrestrial telescopes. At least one of these terrestrial telescopic systems includes reflecting surfaces and both systems form in single field, for example the focus plane of the eyepiece, superposed images of the object whose range is to be found. In order to permit the eyepiece to be unsymmetrical with respect to the objectives so that the whole system may conveniently be mounted on a camera, the optical distances of the objectives from the focus plane are different. According to the invention the erecting lenses are made of different powers so that the relayed images are of the same size.

The range finder may include any of the well-known types of light deviating means for laterally adjusting at least one of the images in the focus plane relative to the other to bring them into register for range finding. Furthermore, the range finder may be of any of the coincidental types such as split field, superimposed images, etc. However, in that embodiment of the invention, in which the light deviating means employs or consists of a laterally movable lens element in one of the systems, it is preferable to use the erecting lens which has the weaker power, for this purpose since a given movement of the image requires greater and hence more accurate adjustment of the sliding lens.

Other advantages and objects of the invention will be apparent from the following description of a preferred embodiment thereof when read in connection with the accompanying drawing, in which:

Fig. 1 is a perspective view of a motion picture camera incorporating the invention.

Fig. 2 illustrates the optical system of the invention.

In Fig. 1 a motion picture camera 10 is provided with a range finder system comprising supports 11 and 12 mounted on the sides of the housing 10. The light deviating means of this range finder is not shown in this figure nor is the manner in which it is coupled to the focusing mechanism of the camera, since neither of these features are critical in the present invention. According to the invention the range finding system comprises objectives 13 and 14 and an eyepiece 15. The objectives form images of the object whose range is to be found and these images are relayed to and erected in, the focus plane of the eyepiece 15 by erecting lenses 17 and 19. The light from the objective 13 is reflected by reflecting surfaces 16 and 18, the latter being either semitransparent or covering only half of the field if a split-field type range finder is being used.

The objectives 13 and 14 are preferably of the same power, but whether they have the same power or not, the erecting lenses 17 and 19 are of such power that the images formed in the focus plane of the eyepiece 15 are of the same size, i. e. equal magnification. Having these erecting lenses of different powers permits the eyepiece 15 to be unsymmetrically located on the rear of the housing with respect to the objectives 13 and 14 rather than centrally located.

In Fig. 2 the range finder consists of objectives 25 and 26, eyepiece 27, erector lenses 28 and 29 and reflecting surfaces 30 and 31. The light from the object whose range is to be found, as represented by arrows 32 and 33 is focused by the objectives 25 and 26 to form inverted images 34 and 35. The erecting lenses 28 and 29 have different powers, so that they form in the focus plane of the eyepiece 27 superposed relayed images of the images 34 and 35 as shown by the arrow 36. The two images represented by the arrow 36 and seen by the eye 37 of the observer may be in a split field or completely superposed (in register when the instrument is adjusted for that particular range).

The lateral adjustment of one of the images relative to the other may be provided by tilting one of the mirrors 30 or 31, but in the embodiment shown is provided by a mount 38 for the lens 29, which is the weaker of the two erecting lenses 28 and 29. This mount 38 is laterally adjustable to the position shown by broken lines 39, and when the adjustment is such that the images represented by the arrow 36 are in register, the range of the object may be read by a pointer 40 carried by the mount 38 against a suitably mounted scale 41. The showing of the adjusting means, in this figure is only schematic, since any of the well-known adjustable light deviating means may be used.

Thus in the preferred embodiment of the invention, the focus plane of the eyepiece 27 is directly behind one of the objectives 25 and 26, namely the objective 25. The invention is equally applicable to any range finding system, in which it is desirable to mount the eyepiece unsymmetrical with respect to the objectives.

Having thus described the preferred embodiment of my invention, I wish to point out that it is not limited to this structure, but is of the scope of the appended claims.

What I claim and desire to secure by Letters Patent of the United States is:

1. A range finder comprising two laterally spaced positive objectives for forming in their image planes, images of the object whose range is to be found, two optical relay positive objective systems, at least one of which includes reflecting surfaces, respectively for forming in a single field relayed images of said object images, the field being optically at different distances from the image planes and the relay systems having correspondingly different powers for forming relay images of equal size and means for viewing said field.

2. A range finder comprising a support with two laterally spaced viewpoints on the front, an eyepiece on the rear of the support unsymmetrical with the viewpoints, a terrestial telescopic system behind each of the view points for forming in the focus plane of the eyepiece, two upright images of the object whose range is to be found, at least one of the telescopic systems including reflecting surfaces, and at least one of the telescopic systems including adjustable light deviating means for altering the register of the images, the optical distances from the viewpoints to the focus plane being different and the erecting lenses of the two terrestrial telescopic systems having correspondingly different power to give said images equal magnification.

3. A range finder comprising a support, two positive objectives of equal power laterally spaced on the front of the support for forming images of the object whose range is to be found, an eyepiece mounted on the rear of the support unsymmetrical with the objectives, positive erecting lenses of different powers for relaying said object images to the focus plane of the eyepiece and for forming in said plane images of equal size, reflecting surfaces cooperating with at least one of the erecting lenses for relaying the images and means for laterally adjusting one of the images in the focus plane relative to the other.

4. A range finder according to claim 3 in which the eyepiece is directly behind one of the objectives and the reflecting surfaces receive light from the other objective.

5. A range finder according to claim 3 in which the adjusting means consists of means for laterally moving the weaker of the two erecting lenses.

6. A range finder for a camera having a housing, comprising two positive objectives laterally spaced on the front of the housing for forming in the housing images of the object whose range is to be found, an eyepiece on the rear of the housing unsymmetrical with the objectives, reflecting surfaces in the housing for reflecting light from the objectives through the eyepiece, the objectives being at different optical distances from the eyepiece, positive erecting lenses mounted respectively in the paths of said light for forming in the focus plane of the eyepiece relayed images of said object images, said erecting lenses having such power that the relayed images are of equal size, and means for laterally adjusting one of the images in the focus plane.

OTTO WITTEL.